(12) United States Patent
Kamarauskas et al.

(10) Patent No.: US 6,848,833 B1
(45) Date of Patent: Feb. 1, 2005

(54) REPLACEABLE FIBER OPTIC INTERFACE MODULE

(75) Inventors: Michael R. Kamarauskas, Bloomingdale, IL (US); David S. Rifkin, Aurora, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/616,308

(22) Filed: Jul. 9, 2003

(51) Int. Cl.[7] .............................. G02B 6/38; G02B 6/36
(52) U.S. Cl. .............................. 385/55; 385/75; 385/80
(58) Field of Search .............................. 385/55, 72, 75, 385/80, 92, 94, 58, 60, 70

(56) References Cited

U.S. PATENT DOCUMENTS

| 4,717,234 A | | 1/1988 | Barlow et al. ........... 350/96.21 |
|---|---|---|---|
| 5,233,675 A | | 8/1993 | Cannetti ..................... 385/75 |
| 5,263,106 A | | 11/1993 | Rosson ....................... 385/72 |
| 5,359,688 A | * | 10/1994 | Underwood ................. 385/70 |
| 5,706,379 A | | 1/1998 | Serafini et al. ............... 385/75 |
| 5,737,464 A | * | 4/1998 | Underwood et al. .......... 385/72 |
| 5,751,874 A | | 5/1998 | Chudoba et al. ............. 385/72 |
| 6,079,881 A | * | 6/2000 | Roth .......................... 385/76 |
| 6,296,398 B1 | * | 10/2001 | Lu ............................. 385/60 |
| 6,535,671 B1 | * | 3/2003 | Poole .......................... 385/48 |

* cited by examiner

Primary Examiner—Chandrika Prasad
(74) Attorney, Agent, or Firm—Romi N. Bose

(57) ABSTRACT

A replaceable module is provided for attachment to a standard fiber optic connector and an opto-electronic device on a printed circuit board. The module is mounted between the internal assembly and the external assembly of a fiber optic connector. The module is easily replaceable without requiring access to the interior side of the mounting panel and without requiring disconnection of the internal assembly from the opto-electronic device on the printed circuit board. Use of the replaceable module when connecting to an external device results in reduced wear on the internal assembly, thereby enabling an increase in the number of mating cycles that the internal assembly is able to perform.

28 Claims, 6 Drawing Sheets

REPLACEABLE FIBER OPTIC INTERFACE MODULE

FIELD OF THE INVENTION

This invention is generally directed to a replaceable module to be used with a connector for connecting one fiber optic device to another fiber optic device that may reside on a printed circuit board.

BACKGROUND OF THE INVENTION

In the optical fiber field, fibers are used in optical transmission systems to transfer light or optical energy throughout a system. Optical energy is transmitted between fibers by connecting the fibers end-to-end. In order to more easily connect the fibers end-to-end, the fibers are typically terminated in connector assemblies. The connector assemblies encapsulate and center the fibers so that the fibers can be easily connected in the end-to-end manner.

Prior art fiber optic connectors typically include an internal opto-electronic assembly which is attached to a printed circuit board on the interior side of a mounting panel and an external assembly which is connected to a fiber optic device on the exterior side of the mounting panel. Each assembly includes one or more optical fibers. In use, the external assembly is mated with the internal assembly so that information from the fiber optic device can be delivered through the mated fibers to the device on the printed circuit board. Each time the external assembly is mated with the internal assembly the potential for damage to the fiber ends exists. Damage can be caused for example as the ends of the fibers are contacted or if dust or debris collects on the exposed fiber ends. These problems are exasperated when the fiber optic devices are repeatedly connected and disconnected from the connector, such as, for example, when disposable fiber optic devices are used. Upon completion of use of the fiber optic device, the device is disconnected from the remainder of the assembly and then discarded. A new fiber optic device must then be attached to the remainder of the assembly. The repeated matings of the internal assembly with multiple external assemblies causes wear and sometimes damage to the connector and the fibers within the connector.

When damage to the fibers or connector occurs, the connector must be repaired or replaced. Not only is this costly, but it is also time consuming. In particular, replacement of the internal assembly can be complicated as it not only requires access to the interior side of the mounting panel but also requires disconnection of the interior assembly from the printed circuit board and therefore must be performed by an individual having necessary knowledge and skills to perform such a task.

OBJECTS AND SUMMARY OF THE INVENTION

A general object of the present invention is to provide a replaceable module for use with a fiber optic connector.

An object of the present invention is to provide a replaceable module which can be easily mounted to and dismounted from a fiber optic connector.

Briefly, and in accordance with the foregoing, a module is provided for mounting between the internal assembly and the external assembly of a fiber optic connector. The module is easily replaceable without requiring access to the interior side of the mounting panel and without requiring disconnection of the internal assembly from the printed circuit board. Advantageously, the replaceable module limits the number of mating cycles at the fiber optic interface. Because repeated mating cycles can damage the polished fiber ends, a replaceable module at the fiber interface overcomes such cycling issues. In other words, the internal assembly will experience only a single mating (when the replaceable module is discarded) for every "X" number of matings the replaceable module will potentially experience with external assemblies.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

Figure 1:
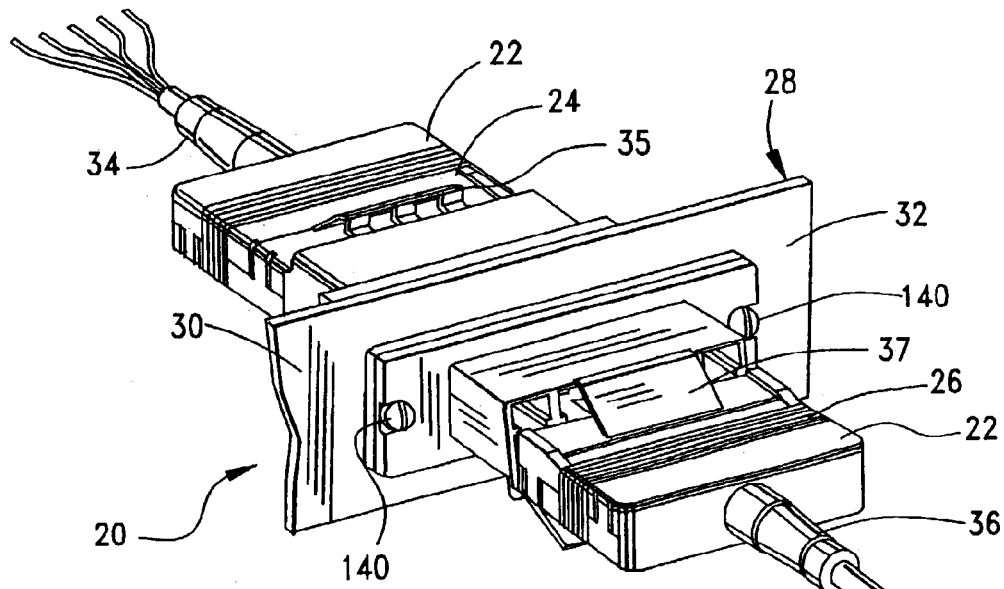
FIG. 1 is a perspective view of the module of the present invention mounted to a mounting panel and attached on either end to a fiber optic connector.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

As shown in FIG. 1, a replaceable module 20 mates with a standard fiber optic connector 22, such as, for example, an LC connector. More specifically, the replaceable module 20 provides connection between an internal assembly 24 of the fiber optical connector 22 and an external assembly 26 of the fiber optical connector 22. The internal and external assemblies 24, 26 are identical. The internal assembly 24 is provided on the interior side 28 of a mounting panel 30 and the exterior assembly 26 is provided on the exterior side 32 of the mounting panel 30. The internal assembly 24 is connected, through a bundle of individual optical fibers 34, to internal fiber opto-electronic devices (not shown), which are mounted on a printed circuit board (not shown). A latch mechanism 35 is provided for mating the internal assembly 24 and the replaceable module 20. The external assembly 26 is connected, through a bundle of individual optical fibers 36, to a fiber optic device, such as, for example, a fiber optic probe (not shown). A latch mechanism 37 is provided for mating the external assembly 26 and the replaceable module 20.

Figure 2:
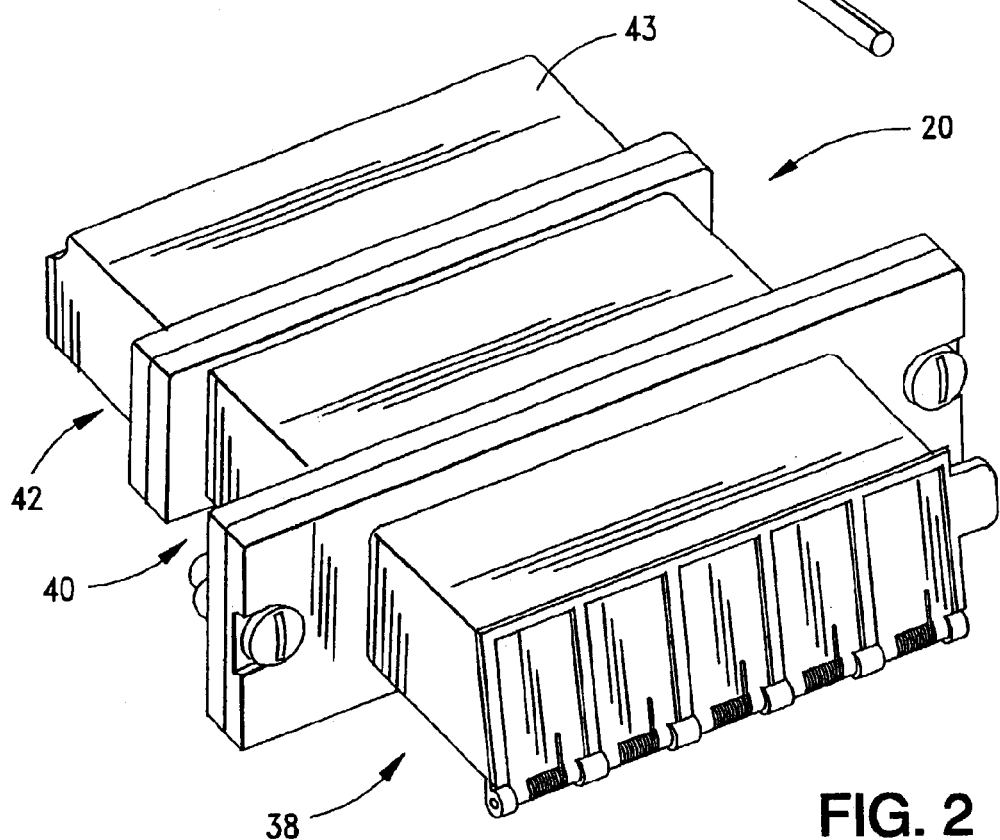
FIG. 2 is a perspective view of the module of the present invention.
Figure 3:
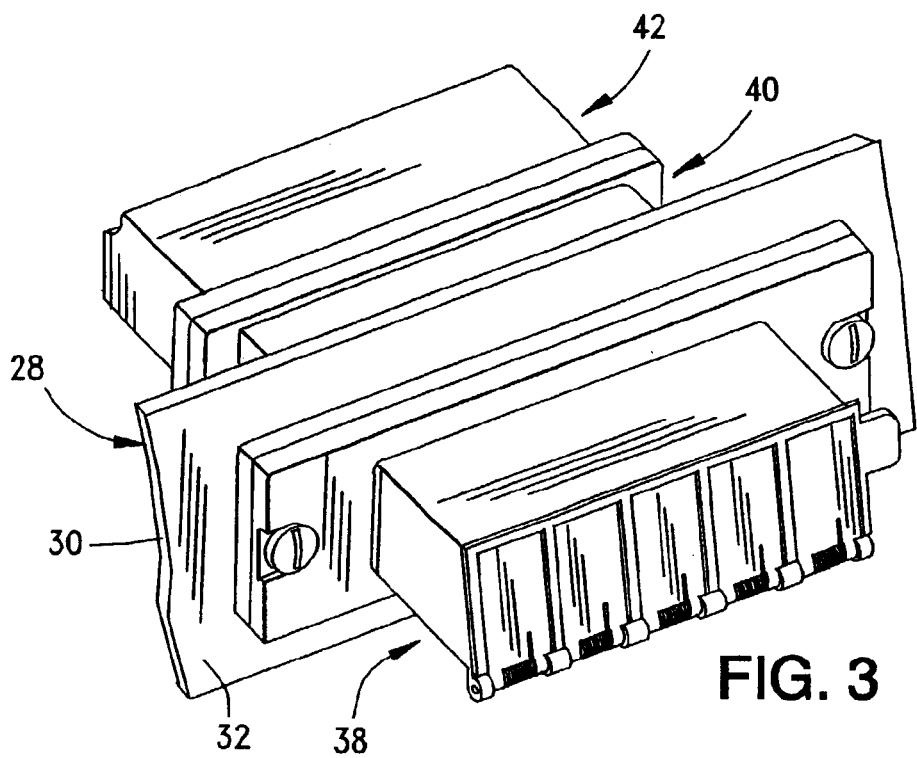
FIG. 3 is a perspective view of a module of FIG. 2 mounted to a mounting panel.

As shown in FIG. 2, the replaceable module 20 includes an external portion 38, an intermediate portion 40 and an internal portion 42. As shown in FIG. 3, the external portion 38 is provided on the exterior side 32 of the mounting panel 30 and the internal portion 42 is provided on the interior side 28 of the mounting panel 30. The intermediate portion 40 is positioned between the external portion 38 and the internal portion 42 and within an aperture 43 through the mounting panel 30 (See FIG. 10).

Figure 4:
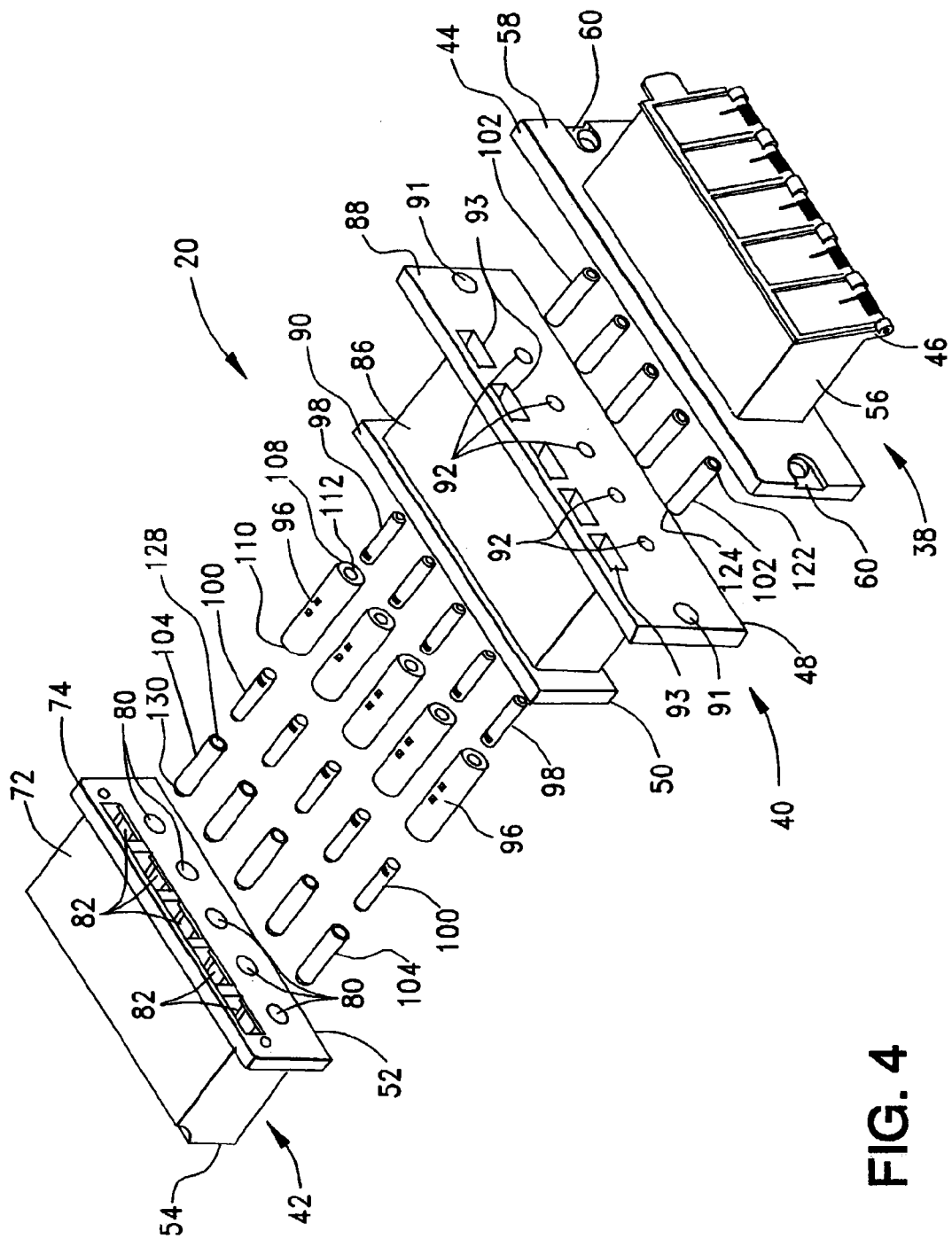
FIG. 4 is an exploded perspective view of the module of FIG. 2.

As best shown in FIG. 4, the external portion 38 includes a fixed end 44 and a free end 46. The intermediate portion 40 includes a first end 48 and a second end 50. The internal portion 42 includes a fixed end 52 and a free end 54. When assembled, the fixed end 44 of the external portion 38 abuts the first end 48 of the intermediate portion 40 and the fixed end 52 of the internal portion 42 abuts the second end 50 of the intermediate portion 40. Although the external and internal portions 38, 42 are orientated in opposite manners with respect to the intermediate portion 40, the external portion 38 and the internal portion 42 are identical with the exception of particular features that will be described.

The external portion 38 includes a generally rectangularly shaped housing 56. A rectangularly shaped end wall 58 is provided at the fixed end 44 of the external portion 38. The length and width of the end wall 58 are larger than the length and width of the housing 56. The perimeter of the end wall 58 is also larger than the aperture 43 in the mounting 30 through which the replaceable module 20 is mounted. Mounting apertures 60 are provided through the end wall 58 on opposite sides of the end wall 58.

Figure 5:
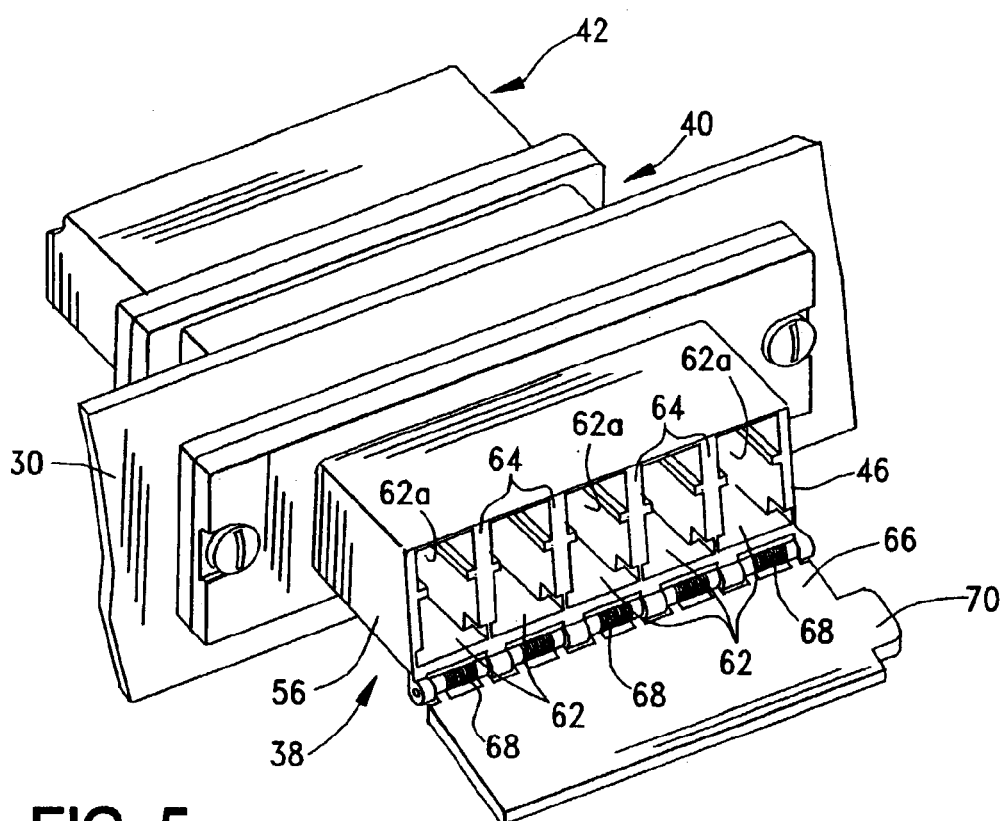
FIG. 5 is a perspective view of a the module of FIG. 2 with a shutter door in an open position.

As shown in FIG. 5, five (5) fiber optic passageways 62 extend through the housing 56 and the end wall 58. The portions 62a of the passageways 62 through the housing 56 are generally rectangular and the portions of the passageways 62 through the end wall 58 are cylindrically shaped. The cylindrically shaped portions of the passageways 62 are shown on the internal portion 42 in FIG. 4. Inner walls 64 are provided between the fiber optic passageways 62.

A safety shutter 66 is mounted at the free end 46 of the external portion 38 by hinges 68. A thumb latch 70 is provided for opening the safety shutter 66. Preferably, a spring (not shown) is provided to bias the safety shutter 66 in the closed position (as shown in FIG. 2). When force is applied to the thumb latch 70, the safety shutter 66 rotates about the hinges 68 to an open position as shown in FIG. 5. A safety shutter is not provided at the free end 54 of the internal portion 42.

Five (5) rectangularly shaped welding recesses are provided in the end wall 58 for welding the external portion 38 to the intermediate portion 40 as will be described herein. The welding recesses of the external portion 38 are shown on the internal portion 42 in FIG. 4.

As best shown in FIG. 4, the internal portion 42 of the replaceable module 20 includes a generally rectangularly shaped housing 72 and an end wall 74. Unlike the end wall 58 of the exterior portion 38, the perimeter of the end wall 74 is smaller than the aperture 43 through the mounting panel 30. In addition, the end wall 74 does not include mounting apertures.

Five (5) passageways 80 are provided through the housing 72 and end wall 74. The passageways 80 are identical to the passageways 62 through the external portion 38 with a portion through end wall 74 being cylindrical and a portion through the housing 72 being rectangular. Each passageway 80 provides alignment and housing for a single optical fiber. Five (5) rectangularly shaped welding recesses 82 are provided in the end wall 74 for welding the internal portion 42 to the intermediate portion 40 as will be described herein.

The intermediate portion 40 of the replaceable module 20 includes a generally rectangularly shaped housing 86. A rectangularly shaped first flange 88 is provided at the first end 48 and a rectangularly shaped second flange 90 is provided at the second end 50. The perimeter of the first flange 88 is larger than the aperture 43 through the mounting panel 30 and is larger than the perimeter of the second flange 90. Mounting apertures 91 are provided on either side of the first flange 88. The perimeter of the second flange 90 is smaller than the perimeter of the aperture 43 through the mounting panel 30. Five (5) passageways 92 extend from the first end 48 to second end 50 of the intermediate portion 40. Protrusions 93 extend from the first flange 88 and the second flange 90. The protrusions 93 extending from the first flange 88 are aligned with the recesses in the end wall 58 of the external portion 38. The protrusions 93 extending from the second flange 90 are aligned with the recesses 82 in the end wall 74 of the internal portion 42.

Figure 6:
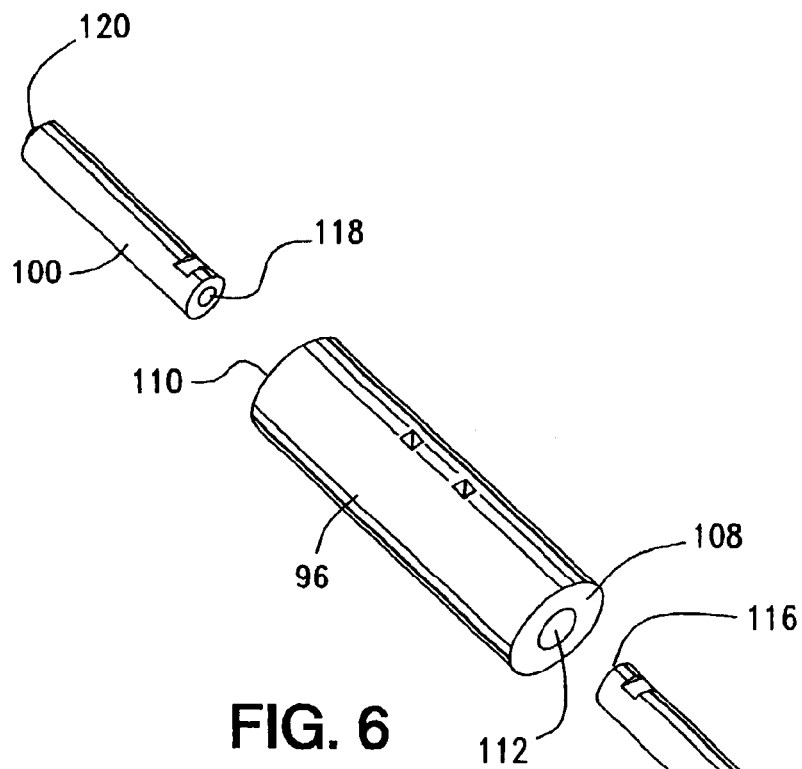
FIG. 6 is an exploded perspective view of a spacer and ferrules of the module of FIG.

The replaceable module 20 includes five spacers 96, five exterior ferrules 98, five interior ferrules 100, five exterior sleeves 102, five interior sleeves 104 and five optical fibers 105. As best shown in FIG. 6, the spacers 96 are generally tubular with an exterior end 108 and an interior end 110. Each spacer 96 includes a cylindrically shaped passageway 112 that extends from the interior end 110 of the spacer 96 to the exterior end 108 of the spacer 96. The exterior ferrules 98 and the interior ferrules 100 are also tubular. Each exterior ferrule 98 includes a first end 114 and a second end 116. A passageway extends from the first end 114 to the second end 116 of the exterior ferrule 98. Each interior ferrule 100 includes a first end 118 and second end 120. A passageway extends from the first end 118 to the second end 120 of the interior ferrule 100. The diameter of the ferrules 98, 100 is slightly smaller than the diameter of the passageways 112 of the spacer 96.

As shown in FIG. 4, the external sleeves 102 are tubular and include first ends 122 and second ends 124. A cylindrically shaped passageway extends from the first end 122 to the second end 124 of each external sleeve 102. Each external sleeve 102 includes a split that extends from the first end 122 to the second end 124, and allows the sleeve 102 to expand as will be described herein. The internal sleeves 104 are tubular and include first ends 128 and second ends 130. A cylindrically shaped passageway extends from the first end 128 to the second end 130 of each internal sleeve 104. Each internal sleeve 104 includes a split which extends from the first end 128 to the second end 130, and allows the sleeve 104 to expand as will be described herein.

Figure 7:
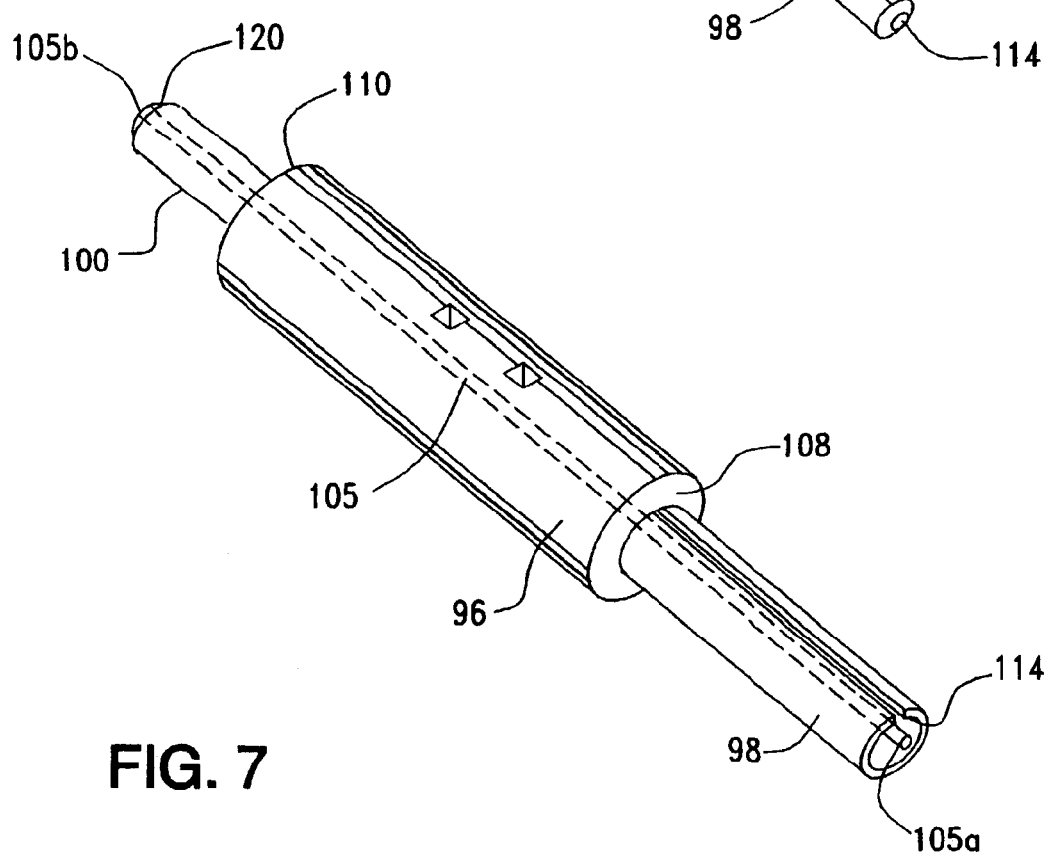
FIG. 7 is a perspective view of a spacer, ferrules and a optical fiber of the module of FIG. 2.

As shown in FIG. 7, an optical fiber 105 is positioned within the passageway 112 of each spacer 96 and extends through the passageway of external ferrule 98 and through the passageway of the internal ferrule 100. Each optical fiber 105 has a first end 105a and a second end 105b.

To assemble the replaceable module 20, a bonding agent, such as, for example, epoxy is applied to the second ends 116 of each external ferrule 98. The external ferrule 98 is then placed within the passageway 112 proximate the first end 108 of the spacer 96 and bonded with the spacer 96. A first end 105a of each fiber 105 is then passed through the passageway 112 of each spacer 96 and the passageway of the external ferrule 98 and bonded within the external ferrule 98. Next, a second end 105*b* of each fiber 105 is passed through the passageway of an internal ferrule 100. Each internal ferrule 100 is then placed within the passageway 112 proximate the second end 110 of the spacer 96 and bonded thereto. The spacer 96 is then filled with a bonding agent such as, for example, epoxy, to stabilize the fiber 105. Upon assembly of the fiber 105, the spacer 96 and the ferrules 98, 100, the first end 114 of the external ferrule 98 extends beyond the first end 108 of the spacer 96 and the second end 120 of the internal ferrule 100 extends beyond the second end 110 of the spacer 96. In addition, the fiber 105 extends within the external ferrule 98, the spacer 96 and the internal ferrule 100 and the first end 105*a* of the fiber 105 is proximate the first end 114 of the external ferrule 98 and the second end 105*b* of the fiber 105 is proximate the second end 120 of the internal ferrule 100.

Figure 8:
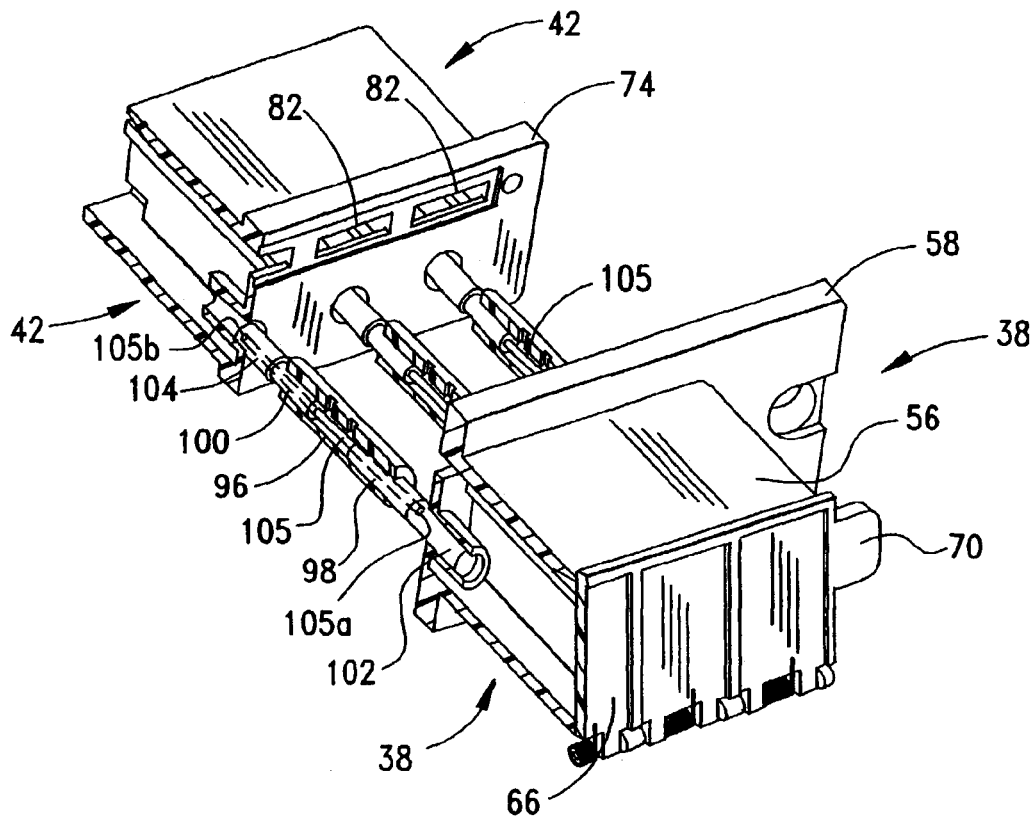
FIG. 8 is a perspective view of portions of the module of FIG. 2 which are shown in cross section.
Figure 9:
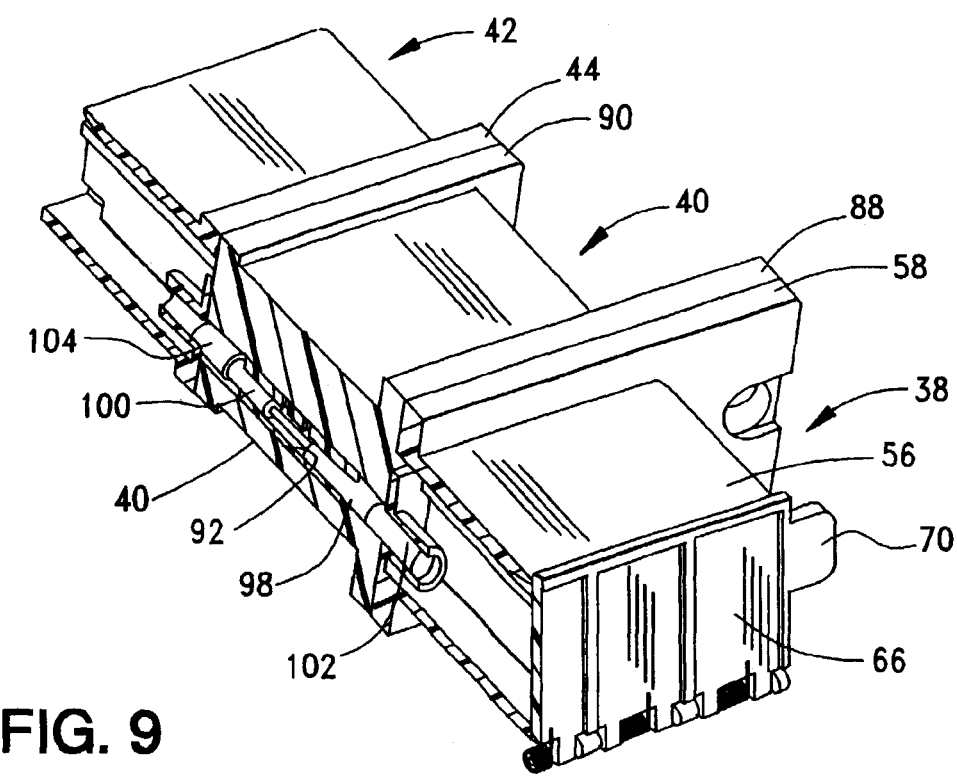
FIG. 9 is a perspective view of the module of FIG. 2 which are shown in cross section.

Next the ends 105*a*, 105*b* of the fiber 105 are polished and the fiber 105, spacer 96 and ferrules 98, 100 are placed within the passageway 92 of the intermediate portion 40. Each spacer 96 and the assembled ferrules 98, 100 are then positioned within a respective passageway 92 of the intermediate portion 40 as shown in FIGS. 8 & 9 by passing each spacer 96 and the assembled ferrules 98, 100 through the second flange 90 of the intermediate portion 40 and within the respective passageway 92. The fiber 105, spacer 96, and the ferrules 98, 100 are allowed to float within the passageway 92 to enable proper mating forces on the connectors.

An internal sleeve 104 is placed around the second end 120 of each internal ferrule 100 and is then passed through the second flange 90 of the intermediate portion 40 and within the respective passageway 92 until the first end 128 of each internal sleeve 104 abuts the second end 110 of the spacer 96. As the internal ferrule 100 passes within the internal sleeve 104, the slit along the internal sleeve 104 allows the sleeve 104 to expand to allow the internal ferrule 100 to slide within the sleeve 104. The second end 130 of each internal sleeve 104 is then positioned within the passageways 80 of the internal portion 42 until the end wall 74 of the internal portion 42 abuts the second flange 90 of the intermediate portion 40. When the end wall 74 of the internal portion 42 abuts the second flange 90 of the intermediate portion 40, the protrusions 93 extending from the second flange 90 are positioned within the recesses 82 of the internal portion 42.

An external sleeve 102 is placed around the first end 114 of each external ferrule 98 and is then passed through the first flange 88 of the intermediate portion 40 and within the respective passageway 92 until the second end 124 of each external sleeve 102 abuts the first end 108 of the spacer 96. As the external ferrule 98 passes within the external sleeve 102, the slit along the external sleeve 102 allows the sleeve 102 to expand to allow the external ferrule 98 to slide within the sleeve 102. The first end 122 of each external sleeve 102 is then positioned within the passageways 62 of the external portion 38 until the end wall 58 of the external portion 38 abuts the first flange 88 of the intermediate portion 40. When the end wall 58 of the external portion 38 abuts the first flange 88 of the intermediate portion 40, the protrusions 93 extending from the first flange 88 of the intermediate portion 40 will be positioned within the recesses in the end wall 58 of the external portion 38.

When the end wall 58 of the external portion 38 abuts the first flange 88 of the intermediate portion 40 and the end wall 74 of the internal portion 42 abuts the second flange 90 of the intermediate portion 40, a welding process, such as, for example, a sonic welding process can be used. As a result of the sonic welding process the protrusions 93 extending into the recesses 82 on the end walls 58, 74 of the external and internal portions 38,42 form a bond between the external portion 38 and the intermediate portion 40 and between the internal portion 42 and the intermediate portion 40. With the external portion 36, the intermediate portion 40 and the internal portion 42 secured together, the replaceable module 20 can then be handled as a single unit.

The replaceable module 20 is then connected with the internal assembly 24 by passing the interior portion 42 and the intermediate portion 40 of the module through the aperture 43 in the mounting panel 30 until the first flange 88 of the intermediate portion 40 abuts the exterior surface 32 of the mounting panel 30. The internal assembly 24 is then engaged with the second end 54 of the interior portion 42 of the replaceable module 20 as the latch 35 of the internal assembly 24 engage the housing 72 of the internal portion 42. The replaceable module 20 is then secured to the mounting panel 30 by passing fasteners 140, for example screws, through the mounting apertures 60 in the end wall 58 of the external portion 38 and the apertures 91 in the first flange 88 of intermediate portion 40 of the replaceable module 20 and securing the fasteners 140 to the mounting panel 30.

With the replaceable module 20 mounted to the mounting panel 30, the replaceable module 20 is ready to receive the external assembly 22 associated with a fiber optic device. The thumb latch 70 is used to open the safety shutter 66. Upon opening of the safety shutter 66, each of the five optical fibers 105 within the replaceable module 20 is exposed. The external assembly 26 is then aligned with the external portion 38 of the replaceable module 20 and connected thereto. As the external assembly 26 is engaged with the external portion 56 of the replaceable module 20, the latch 37 of the external assembly 26 engages with the housing 56 of the external portion 38. With the external assembly 26 engaged with the replaceable module 20, connection of the fiber optic device to the internal optoelectronic device by way of the replaceable module 20 is complete. The module 20 allows for passage of optical signals between the internal assembly 24 and the external assembly 26 with minimal attenuation of the signal.

When it becomes necessary to disconnect the fiber optic device, the latch 37 is pressed down and the external assembly 26 associated with the fiber optic device is pulled until it is no longer engaged with the external portion 38 of the replaceable module 20. As the external assembly 26 is pulled away from the external portion 38 of the replaceable module 20, the spring will bias the shutter 66 to a closed position (as shown in FIG. 3), to protect the ends of the optical fibers. Alternatively, if no spring is provided the user closes the shutter 66 by using the thumb latch 70. The shutter prevents dust and debris from coming into contact with the optical fibers. In addition, the shutter acts as a safety mechanism to prevent stray light from exiting the module 20.

As fiber optic devices are repeatedly connected and disconnected to the external portion 38 of the replaceable adaptor 20, it is likely that the ends of the optical fibers will become damaged. When such damage occurs, the module 20 can be easily replaced.

Figure 10:
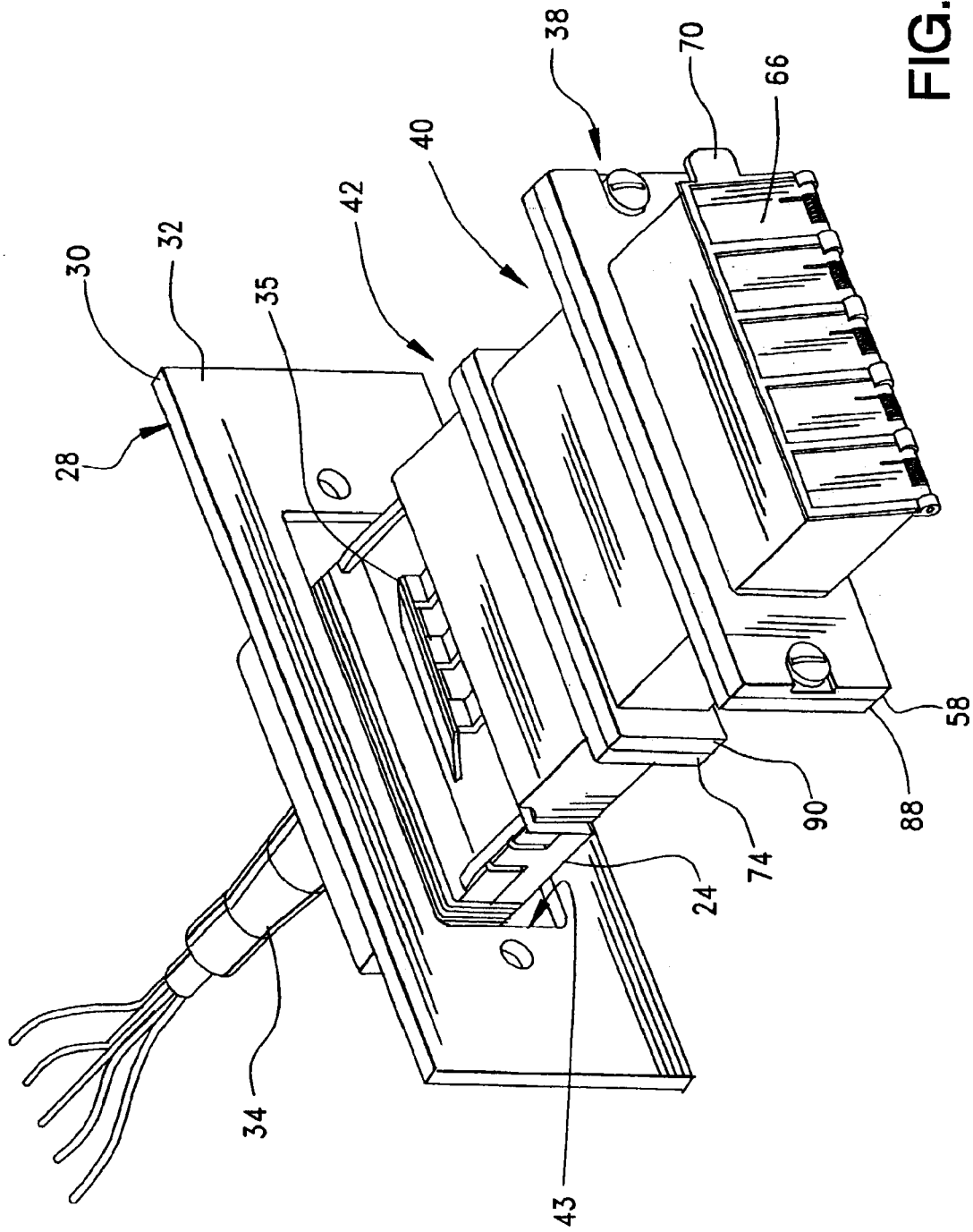
FIG. 10 is a perspective view of the module of FIG. 2 assembled with an internal cable assembly and dismounted from a mounting panel.

To replace the module 20, the user begins by unscrewing the fasteners 140 from the mounting panel 30. Next, the intermediate portion 40 and the internal portion 42 of the replaceable module 20 and the internal assembly 24 of the connector are pulled through the aperture 43 in the mounting panel 30 until the latch 35 of the internal assembly 24 is accessible, as shown in FIG. 10. The latch 35 is then pressed down and the user grasps the internal portion 42 of the replaceable module 20 and pulls until the internal portion 42 of the replaceable module 20 is disconnected from the internal assembly 24 of the connector 22. The replaceable module 20 is then discarded and a new replaceable module 20 is attached to the internal assembly 24. With the new replaceable module 20 attached the internal assembly 24, the internal portion 42 and intermediate portion 40 of the replaceable module 20 are passed through the aperture 43 in the mounting panel 30 until the first flange 48 abuts the exterior side 32 of the mounting panel 30. The replaceable adaptor 20 is then mounted to the mounting panel 30 by fastening mounting screws through the apertures 60 of the external portion 38 and through the apertures 91 of the intermediate portion 40. The replaceable module 20 limits the amount of mating cycles at the fiber optic interface. Preferably, the module 20 is replaced approximately every 500–1000 mating cycles.

The replaceable module 20 can be used with a standard LC type connector. However, unlike the standard connector 22, the replaceable module 20 can easily be removed and replaced as access to the interior side of the mounting panel 30 is not necessary as the components can be passed through the aperture 43 in the mounting panel 30. In addition, the individual is not required to possess any knowledge regarding the printed circuit board to which the transceivers are attached as disconnection from and connection to the printed circuit board is not required.

While five (5) passageways and connections for fiber optical fibers are described and shown, it is to be understood that the module 20 can include any number of passageways and connections desired in order to accommodate any number of optical fibers to be connected.

While preferred embodiments of the present invention are shown and described, it is envisioned that those skilled in the art may devise various modifications of the present invention without departing from the spirit and scope of the appended claims.

What is claimed is:

1. A module for engagement with an internal assembly and an external assembly of a fiber optic connector, comprising:
    a housing including a first end and a second end and at least one passageway extending from the first end to the second end;
    an optical fiber extending through the passageway, the optical fiber configured to carry a signal between the external and internal assemblies, thereby eliminating direct signal transfer between the assemblies;
    wherein the first end of the housing mates with the internal assembly;
    wherein the second end of the housing mates with the external assembly; and
    the housing being detachable from the internal assembly and the external assembly such that the module can be replaced by another module.

2. The module of claim 1, wherein the housing comprises:
    an internal portion including a first end and a second end;
    an external portion including a first end and a second end; and
    an intermediate portion including a first end and a second end, wherein the first end of the internal portion abuts the second end of the intermediate portion and the second end of the external portion abuts the first end of the intermediate portion, and wherein the passageway extends from the first end of the external portion to the second end of the internal portion.

3. The module of claim 1, further comprising a spacer having first and second ends positioned within the passageway, the optical fiber extending through the spacer.

4. The module of claim 2, wherein the internal portion and the intermediate portion are configured as a single piece for receiving a spacer having first and second ends, the spacer also configured to attach to the external portion for joining the external portion to the single piece intermediate and internal portions.

5. The module of claim 3, further comprising an external ferrule positioned at least partially within the spacer proximate the first end thereof and an internal ferrule positioned at least partially within the spacer proximate the second end thereof, the optical fiber extending within the internal ferrule and within the external ferrule.

6. The module of claim 1, further comprising one or more shutters mounted on the housing.

7. The module of claim 6, wherein the shutter comprises a thumb latch.

8. The module of claim 2, wherein the internal portion, the external portion and the intermediate portion are bonded together.

9. The module of claim 8 wherein the internal portion, the external portion and the intermediate portion are bonded through welding.

10. The module of claim 8, wherein the internal portion, the external portion and the intermediate portion are bonded with adhesive.

11. The module of claim 2, wherein the external portion comprises an end wall, the intermediate portion comprises a first flange and a second flange; and the internal portion comprises an end wall; and wherein the end wall of the external portion mates with the first flange of the intermediate portion and wherein the end wall of the internal portion mates with the second flange of the intermediate portion.

12. A module as defined in claim 1 wherein a perimeter of the end wall of the internal portion and a perimeter of the second flange are smaller than a perimeter of the first flange and a perimeter of the end wall of the external portion.

13. A module for engagement with an internal assembly and an external assembly of a fiber optic connector and for transferring optical signals between the internal assembly and the external assembly, comprising:
    an internal portion comprising at least one passageway, wherein the internal portion mates with the internal assembly of the fiber optic connector;
    an external portion comprising at least one passageway, wherein the external portion mates with the external assembly of the fiber optic connector;
    an intermediate portion comprising at least one intermediate passageway wherein the intermediate portion mates with the interior portion and the exterior portion; the passageway of the interior portion being in communication with the intermediate passageway and the intermediate passageway being in communication with the passageway of the external portion; the intermediate portion being detachable from the internal assembly and the external assembly; and
    an optical fiber mounted within the intermediate passageway, the optical fiber configured to carry a signal between the external and internal assemblies, thereby eliminating direct signal transfer between the internal and external portions.

14. The module of claim 13, further comprising a spacer comprising a passageway therethrough and having first and second ends, wherein the spacer is positioned within the intermediate passageway and the optical fiber extends from the first end to the second end of the spacer.

15. The module of claim 13, wherein the external portion comprises an end wall, the intermediate portion comprises a first flange and a second flange; and the internal portion comprises an end wall; and wherein the end wall of the external portion mates with the first flange of the intermediate portion and wherein the end wall of the internal portion mates with the second flange of the intermediate portion.

16. The module of claim 13 wherein the internal portion, the external portion and the intermediate portion are bonded together.

17. The module of claim 13, wherein the external portion further comprises a shutter.

18. The module of claim 13, further comprising an external ferrule having a passageway therethrough and positioned proximate the first end of the spacer and an internal ferrule having a passageway therethrough and positioned proximate the second end of the spacer, the optical fiber extending the passage way of the external ferrule and in the passageway of the internal ferrule.

19. The module of claim 18, wherein the external ferrule and the internal ferrule are bonded with the spacer.

20. The module of claim 18, further comprising:
an internal sleeve positioned around a portion of the internal ferrule and partially positioned within the passageway of the internal portion; and
an external sleeve positioned around a portion of the external ferrule and partially positioned within the passageway of the external portion.

21. The module of claim 18, wherein the external ferrule, the internal ferrule and the spacer float within the intermediate passageway.

22. The module of claim 21, wherein the end wall of the external portion and the first flange of the intermediate portion further include at least one mounting aperture.

23. The module of claim 15, wherein a perimeter of the end wall of internal portion and a perimeter of the second flange are smaller than a perimeter of the first flange and a perimeter of the end wall of the external portion.

24. The module of claim 17, wherein the shutter includes a thumb latch for opening the shutter.

25. The module of claim 24, wherein:
the internal portion includes at least two passageways;
the external portion includes at least two passageways;
the intermediate portion includes at least two passageways; and
the shutter covers the end of the at least two passageways of the external portion.

26. A fiber optic module assembly comprising:
an internal assembly;
an external assembly;
a module having first and second ends and at least one passageway extending from the first end to the second end, wherein the first end of the housing mates with the internal assembly and the second end of the housing mates with the external assembly;
an optical fiber positioned within the at least one passageway, the optical fiber configured to carry a signal between the external and internal assemblies, thereby eliminating direct signal transfer between the assemblies; and
wherein the module is detachable from the internal assembly and the external assembly such that the module can be replaced by another module.

27. The fiber optic module assembly of claim 26, wherein the module further comprises:
an internal portion having first and second ends;
an external portion having first and second ends; and
an intermediate portion having first and second ends, wherein said first end of the intermediate portion mates with the second end of the external portion and the second end of the intermediate portion mates with the first end of the internal portion.

28. The module assembly of claim 27, wherein the internal portion includes an end wall at its first end, the external portion includes an end wall at its second end and the intermediate portion includes a first flange at its first end and a second flange at its second end and wherein a perimeter of end wall of the external portion and a perimeter of the first flange of the intermediate portion are larger than a perimeter of the end wall of the internal portion.

* * * * *